United States Patent
Lo

(10) Patent No.: US 10,427,754 B2
(45) Date of Patent: Oct. 1, 2019

(54) CONTINUOUS DERAILLEUR OF BICYCLE

(71) Applicant: Kuen-Chang Lo, Taichung (TW)

(72) Inventor: Kuen-Chang Lo, Taichung (TW)

( * ) Notice: Subject to any disclaimer, the term of this patent is extended or adjusted under 35 U.S.C. 154(b) by 0 days.

(21) Appl. No.: 15/949,086

(22) Filed: Apr. 10, 2018

(65) Prior Publication Data

US 2018/0297665 A1    Oct. 18, 2018

(30) Foreign Application Priority Data

Apr. 12, 2017 (TW) ................. 106112175
Mar. 26, 2018 (TW) ................. 107203917

(51) Int. Cl.
*B62M 11/02* (2006.01)
*B62M 1/36* (2013.01)
*B62M 17/00* (2006.01)
*B62M 1/10* (2010.01)

(52) U.S. Cl.
CPC ............ *B62M 11/02* (2013.01); *B62M 1/105* (2013.01); *B62M 1/36* (2013.01); *B62M 17/00* (2013.01)

(58) Field of Classification Search
CPC ........ B62M 11/02; B62M 11/10; B62M 1/30; B62M 17/00; F16H 1/14; B62L 5/02; B62L 5/18; B62L 5/20; F16D 2125/52
See application file for complete search history.

(56) References Cited

U.S. PATENT DOCUMENTS

| | | | | |
|---|---|---|---|---|
| 744,428 | A * | 11/1903 | Stollewerk | B62M 1/36 74/810.1 |
| 5,316,327 | A * | 5/1994 | Bell | B62M 17/00 280/260 |
| 5,435,583 | A * | 7/1995 | Foster, Jr. | B62M 1/36 280/237 |
| 5,713,813 | A * | 2/1998 | von Greyerz | B62M 11/16 475/199 |

FOREIGN PATENT DOCUMENTS

FR          984066 A *  7/1951  ............ B62M 11/10

* cited by examiner

*Primary Examiner* — Michael C McCullough

(57) ABSTRACT

A continuous derailleur of a bicycle contains: a drive shaft, a rotary shaft, a brake shaft, and a braking device. The rotary shaft is mounted on the drive shaft. The drive shaft includes a bevel gear member having a first bevel gear and a second bevel gear. The drive shaft includes a first pedal shaft, and the brake shaft includes a first interactive bevel gear and includes the braking device. The rotary shaft includes a second interactive bevel gear and a third interactive bevel gear, and the second interactive bevel gear and the third interactive bevel gear mesh with the second bevel gear of the bevel gear member. The continuous derailleur further contains an output bevel gear, and the output bevel gear is rotatably fitted on the drive shaft, hence the second interactive bevel gear and the third interactive bevel gear mesh with the output bevel gear.

12 Claims, 8 Drawing Sheets

CONTINUOUS DERAILLEUR OF BICYCLE

FIELD OF THE INVENTION

The present invention relates to a continuous derailleur of a bicycle which controls braking frication to saving riding force.

BACKGROUND OF THE INVENTION

A conventional bicycle runs after a rider steps pedals, when riding with or a passenger a heavy object, the riders steps the pedals strenuously. When riding on an uphill, it is possible to break a chain because of excessive stepping force.

Furthermore, the chain drives a rear wheel to run, so it is easy to remove from a sprocket easily.

The present invention has arisen to mitigate and/or obviate the afore-described disadvantages.

SUMMARY OF THE INVENTION

The primary aspect of the present invention is to provide a continuous derailleur of a bicycle which controls braking frication to saving riding force.

Another aspect of the present invention is to provide a continuous derailleur of a bicycle which replaces the sprocket and a chain by using a driving device so as to drive a rear wheel of the bicycle to rotate, thus saving maintenance cost of the chain.

To obtain above-mentioned aspects, a continuous derailleur of a bicycle provided by the present invention contains: a drive shaft, a rotary shaft, a brake shaft, and a braking device.

The rotary shaft is mounted on the drive shaft.

The drive shaft includes a bevel gear member rotatably fitted thereon, and the bevel gear member has a first bevel gear and a second bevel gear.

The drive shaft includes a first pedal shaft fixed on a first end thereof adjacent to the first bevel gear.

The brake shaft includes a first interactive bevel gear disposed on a first end thereof and includes the braking device secured on a second end of the brake shaft, and a rotation speed of the brake shaft is controlled by controlling friction force of the braking device to the brake shaft so as to control a rotation speed of the first interactive bevel gear.

The first interactive bevel gear meshes with the first bevel gear of the bevel gear member.

The rotary shaft includes a second interactive bevel gear and a third interactive bevel gear which are rotatably connected on two ends of the rotary shaft respectively, and the second interactive bevel gear and the third interactive bevel gear mesh with the second bevel gear of the bevel gear member.

The continuous derailleur further comprises an output bevel gear.

The output bevel gear is rotatably fitted on a second end of the drive shaft, hence the second interactive bevel gear and the third interactive bevel gear mesh with the output bevel gear.

DETAILED DESCRIPTION OF THE PREFERRED EMBODIMENTS

Figure 1:
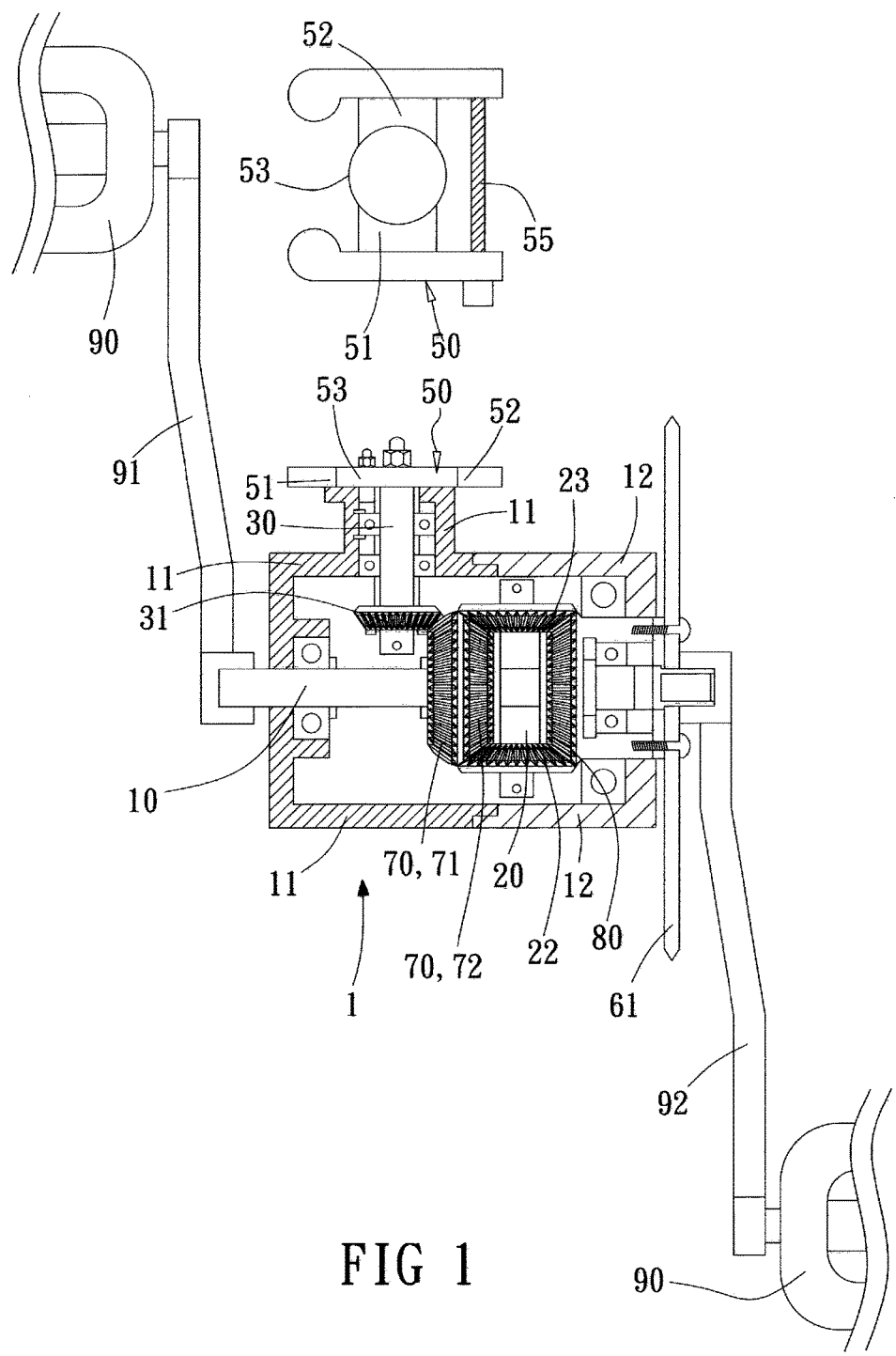
FIG. 1 is a cross sectional view showing the assembly of a continuous derailleur of a bicycle according to a first embodiment of the present invention.
Figure 2:
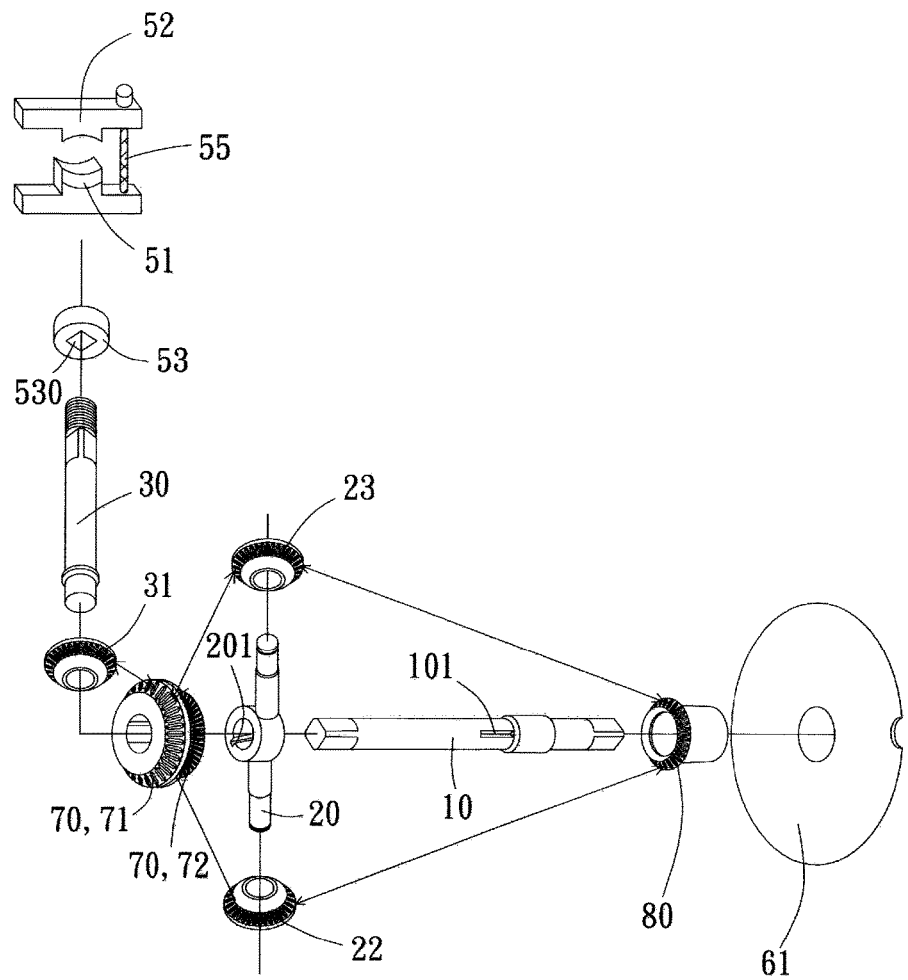
FIG. 2 is a perspective view showing the exploded components of the continuous derailleur of the bicycle according to the first embodiment of the present invention.
Figure 3:
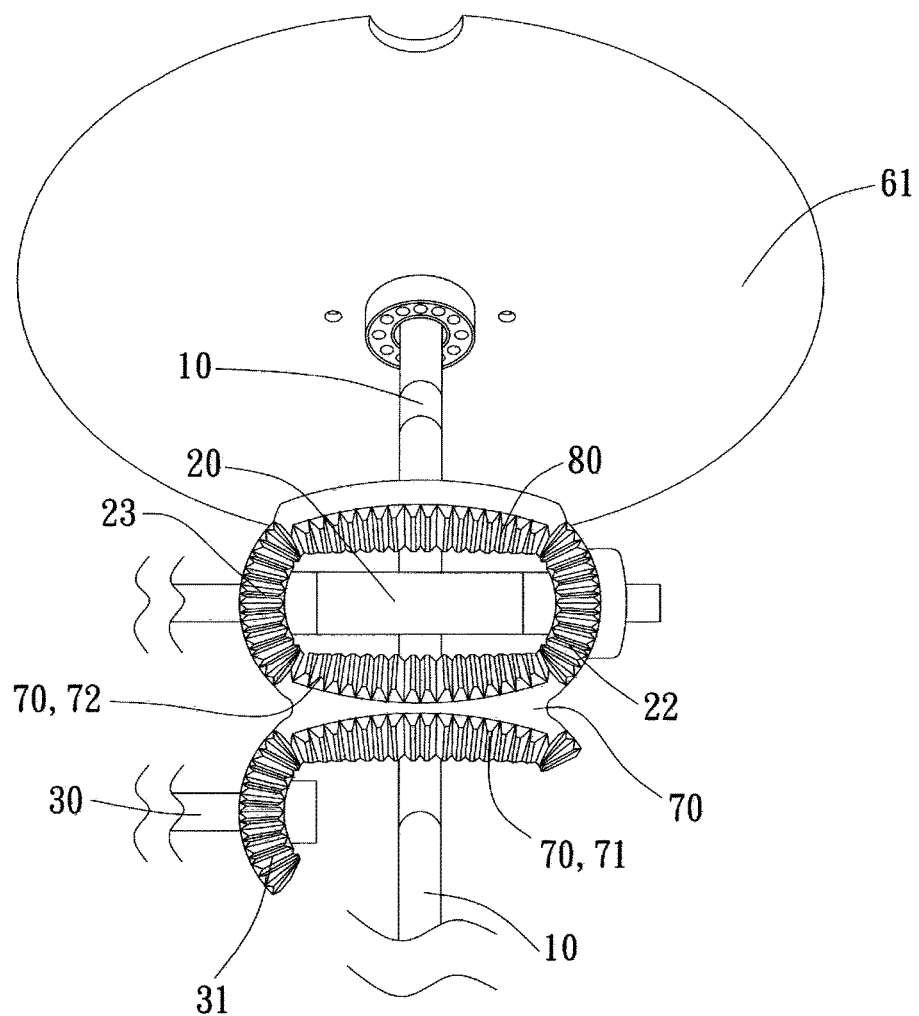
FIG. 3 is a perspective view showing the assembly of a part of the continuous derailleur of the bicycle according to the first embodiment of the present invention.
Figure 4:
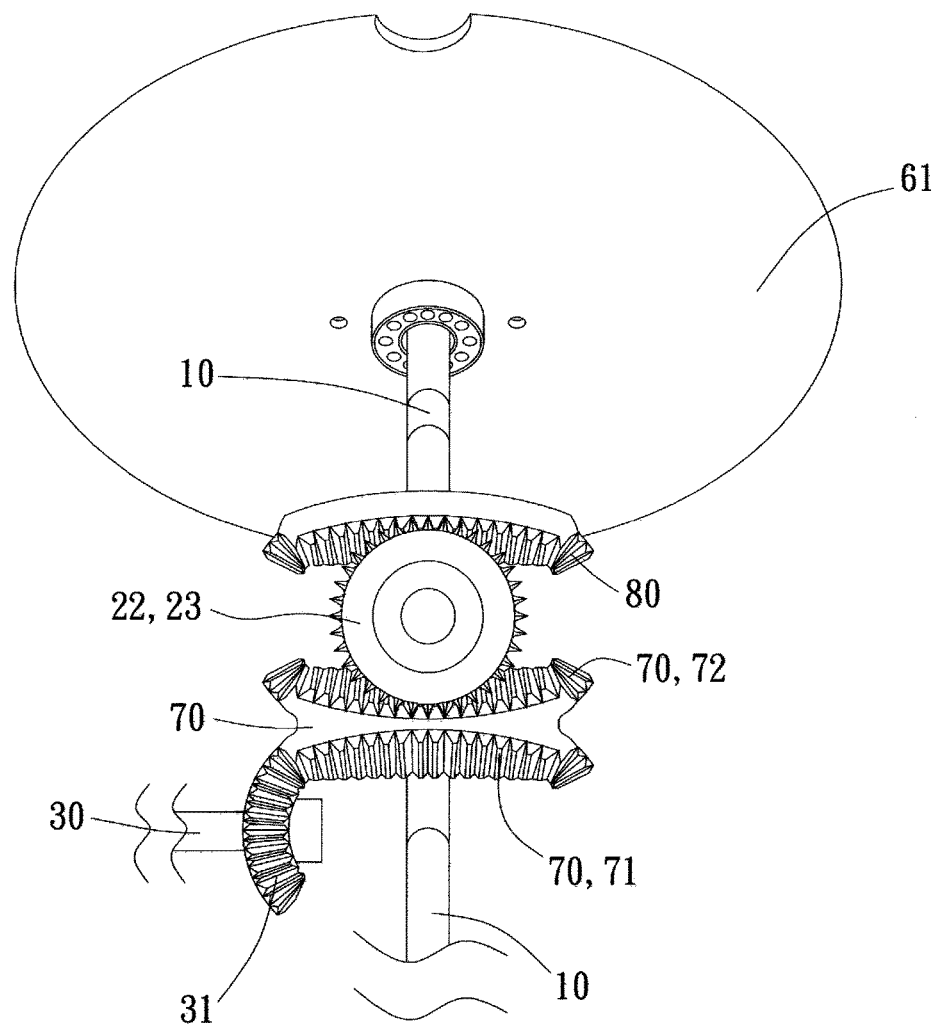
FIG. 4 is another perspective view showing the assembly of a part of the continuous derailleur of the bicycle according to the first embodiment of the present invention.

With reference to FIGS. 1-4, a continuous derailleur 1 of a bicycle according to a first embodiment of the present invention comprises: a drive shaft 10, a rotary shaft 20, a brake shaft 30, and a braking device 50.

The drive shaft 10 includes a first engagement portion 101, the rotary shaft 20 includes a second engagement portion 201 corresponding to and retaining with the first engagement portion 101, such that the rotary shaft 20 is vertically mounted on the drive shaft 10. The drive shaft 10 also includes a bevel gear member 70 rotatably fitted thereon adjacent to the rotary shaft 20, and the bevel gear member 70 has a first bevel gear 71 formed on a first side surface thereof and has a second bevel gear 72 formed on a second side surface of the bevel gear member 70, the drive shaft 10 includes a first pedal shaft 91 fixed on a first end thereof adjacent to the first bevel gear 71. The brake shaft 30 includes a first interactive bevel gear 31 disposed on a first end thereof and includes the braking device 50 secured on a second end of the brake shaft 30. The braking device 50 includes a brake line 55 and a brake hub 53 having a central orifice 530, and the central hole 530 is fitted with the second end of the brake shaft 30. The braking device 50 further includes a first brake lining 51 and a second brake lining 52 which are mounted on two sides of the braking device 50 and are connected with two ends of the brake line 55 individually, hence when the brake line 55 is pulled or is released, the first brake lining 51 and the second brake lining 52 clamp or unclamp the brake hub 53 so as to control a friction force to the brake shaft 30, hence rotation speeds of the brake shaft 30 and the interactive bevel gear 31 are controlled by the braking device 50, and the interactive bevel gear 31 meshes with the first bevel gear 71 of the bevel gear member 70. The rotary shaft 20 includes a second interactive bevel gear 22 and a third interactive bevel gear 23 which are rotatably connected on two ends of the rotary shaft 20 respectively, wherein the second interactive bevel gear 22 meshes with the second bevel gear 72 of the bevel gear member 70, and the third interactive bevel gear 23 meshes with the second bevel gear 72.

The continuous derailleur 1 further comprises an output bevel gear 80 and a sprocket 61. The output bevel gear 80 is rotatably fitted on a second end of the drive shaft 10 adjacent to the rotary shaft 20, hence the second interactive bevel gear 22 and the third interactive bevel gear 23 mesh with the output bevel gear 80. The sprocket 61 is rotatably fitted on the second end of the drive shaft 10, connected with the output bevel gear 80, and located away from the rotary shaft 20. The drive shaft 10 further includes a second pedal shaft 92 mounted on the second end thereof adjacent to the sprocket 61.

The bicycles runs on a road or an uphill with a passenger or/and a heavy object by stepping a pedal 90. As releasing the braking device 50, the bevel gear member 70 is not stopped by the braking device 50 so that the drive shaft 10 is driven by the pedal 90 to rotate, and the rotary shaft 20 is actuated by the drive shaft 10 to rotate and to drive the second interactive bevel gear 22 and the third interactive bevel gear 23 to revolve, such that the second bevel gear 72 and the first bevel gear 71 are driven by the second interactive bevel gear 22 and the third interactive bevel gear 23 to rotate, and the first interactive bevel gear 31 is actuated by the first bevel gear 71 to rotate.

When the brake line 55 of the braking device 50 is pulled, the first brake lining 51 and the second brake lining 52 clamp the brake hub 53 so as to decelerate or stop the first interactive bevel gear 31 of the brake shaft 30, and the bevel gear member 70 is decelerated or is stopped by the first interactive bevel gear 31, in the meantime, the second interactive bevel gear 22 and the third interactive gear 23 of the rotary shaft 20 revolve to accelerate the output bevel gear 80 to rotate. When the bicycle (not shown) runs at a highest speed, the first brake lining 51 and the second brake lining 52 of the brake device 50 clamp the brake hub 53 so as to lock the brake shaft 30, and rotation speeds of the output bevel gear 80 and the sprocket 61 are identical to the second interactive bevel gear 22 and the third bevel gear 23, thus changing the rotation speed of the sprocket 61. The continuous derailleur 1 further comprises a first case 11 and a second case 12 which are connected so as to accommodate the drive shaft 10, the rotary shaft 20, the brake shaft 30, and the braking device 50.

Figure 5:
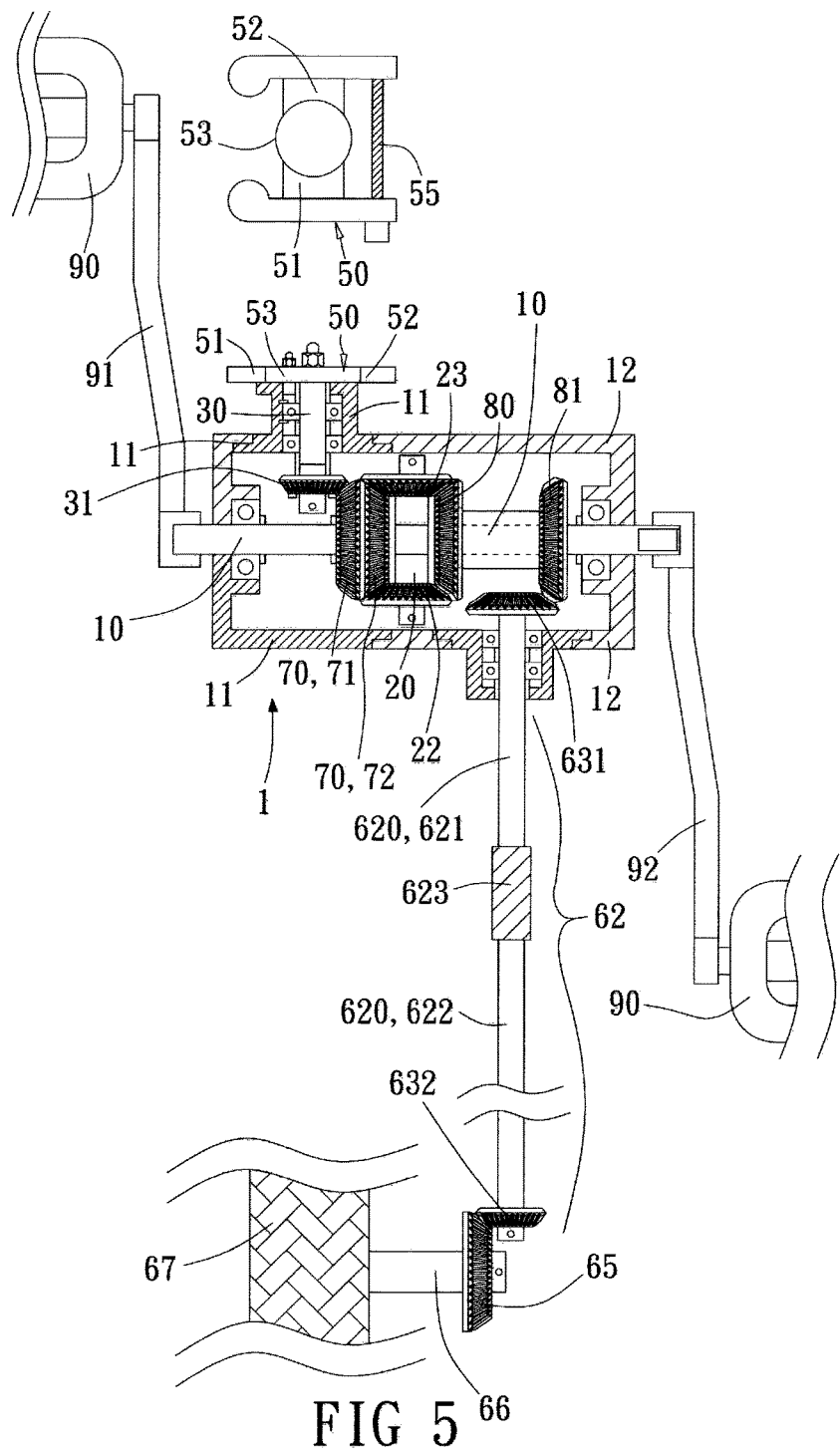
FIG. 5 is a cross sectional view showing the application of the continuous derailleur of the bicycle according to a second embodiment of the present invention.
Figure 6:
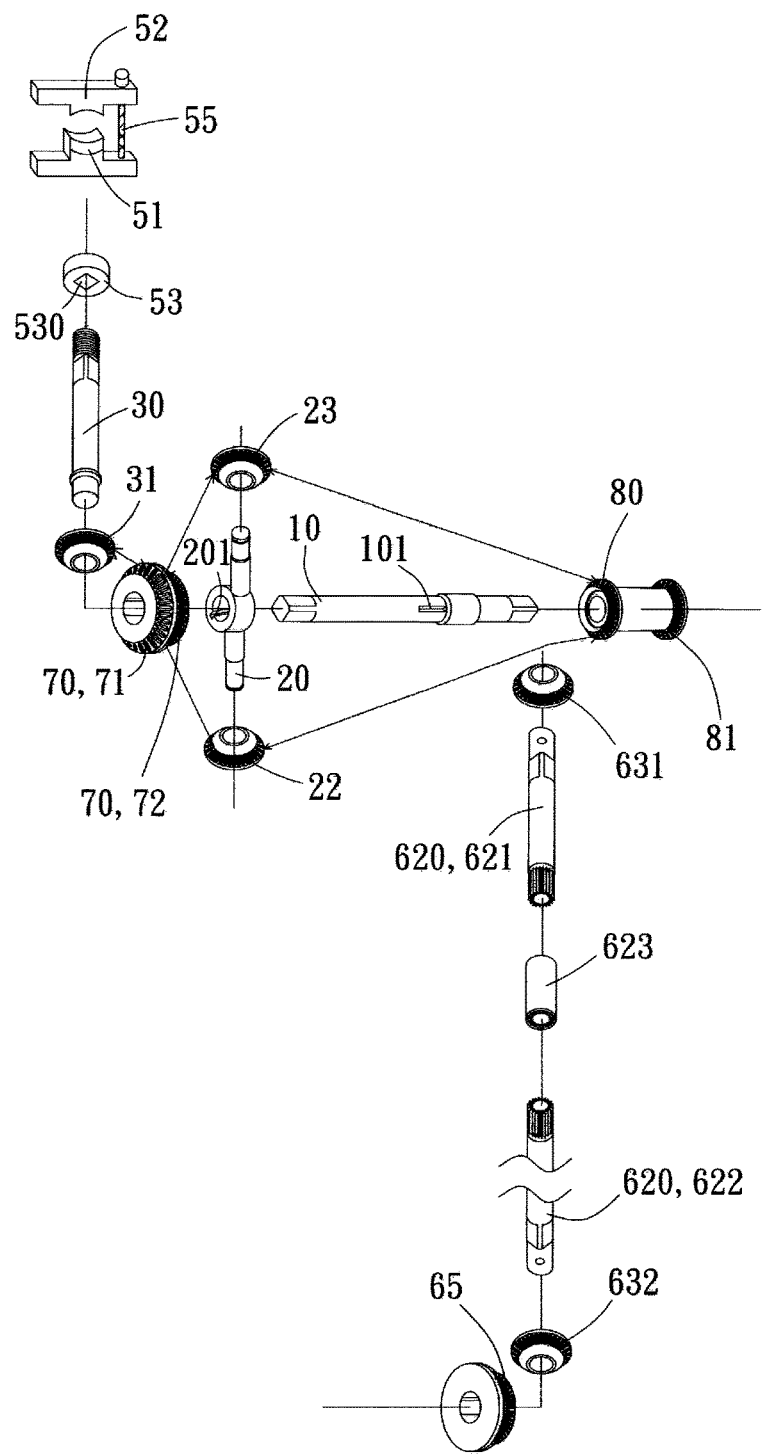
FIG. 6 is a perspective view showing the exploded components of the continuous derailleur of the bicycle according to the second embodiment of the present invention.
Figure 7:
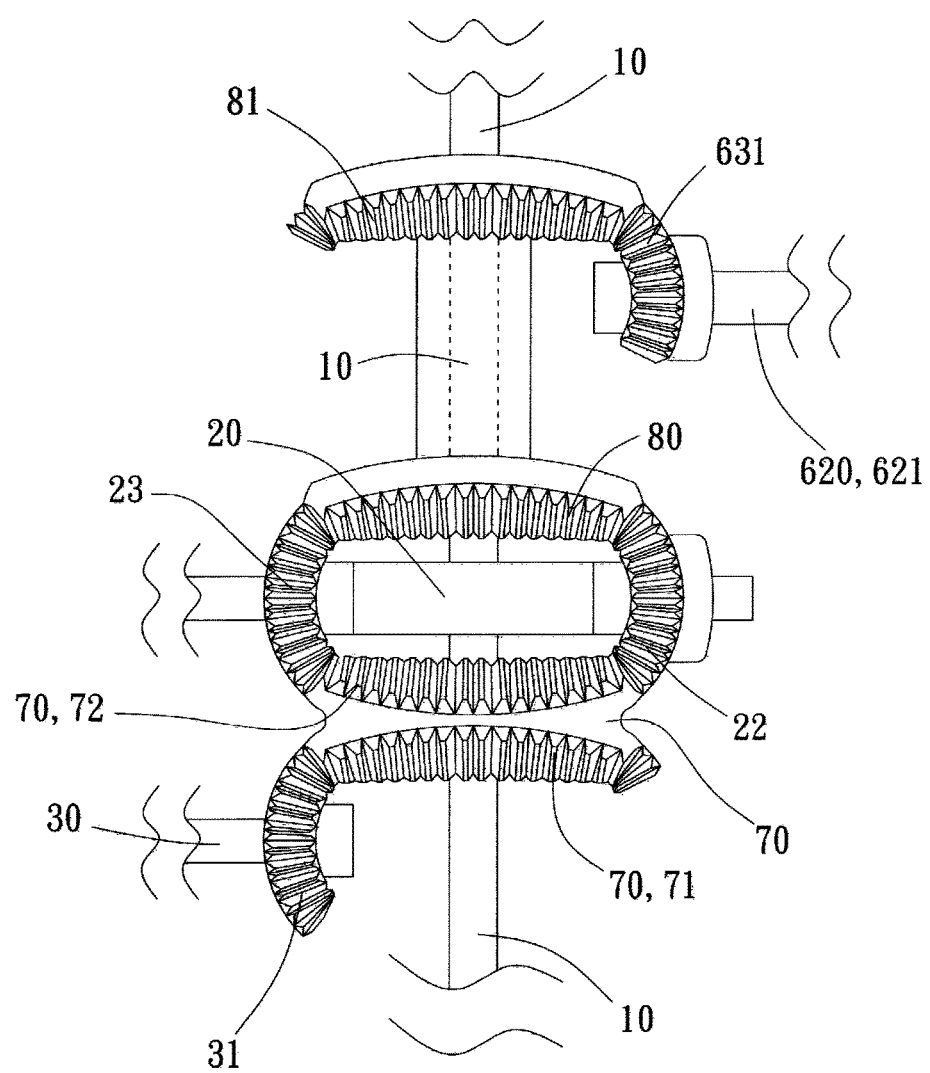
FIG. 7 is a perspective view showing the assembly of a part of the continuous derailleur of the bicycle according to the second embodiment of the present invention.
Figure 8:
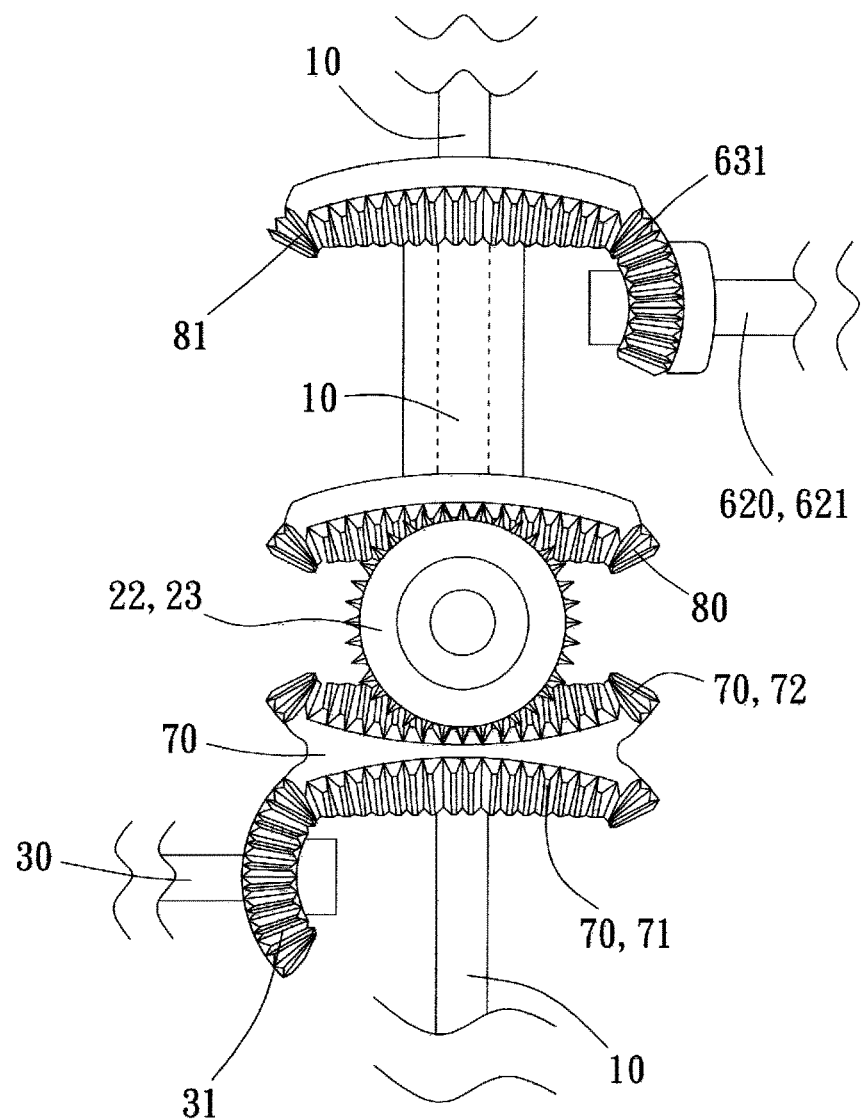
FIG. 8 is another perspective view showing the assembly of a part of the continuous derailleur of the bicycle according to the second embodiment of the present invention.

Referring to FIGS. 5-8, in a second embodiment, a driving device 60 replaces the sprocket 61 and a chain (not show) so as to drive a rear wheel 67 of the bicycle (not shown) to rotate.

The driving device 62 includes a first bevel output gear 81, a beveled transmitting gear 65, and a transmission hub 66. The first bevel output gear 81 and the output bevel gear 80 are rotatably fitted on the second end of the drive shaft 10, and the first bevel output gear 81 is in connection with the output bevel gear 80. The driving device 62 further includes an output shaft 620, a first beveled drive gear 631 and a second beveled drive gear 632 which are fixed on two ends of the output shaft 620 respectively, wherein the first beveled drive gear 631 meshes with the first bevel output gear 81, the second beveled drive gear 632 meshes with the beveled transmitting gear 65, the beveled transmitting gear 65 is disposed on a first end of the transmission hub 66, and a second end of the transmission hub 66 is coupled with the rear wheel 67. The output shaft 620 has a first extension 621 and a second extension 622, wherein a first end of the first extension 621 is connected with the first beveled drive gear 631, a second end of the first extension 621 is fitted with a first end of the second extension 622 by way of a fitting element 623, and a second beveled drive gear 632 is connected with a second end of the second extension 622.

When stepping the pedal 90 to drive the drive shaft 10 to revolve, the rotary shaft 20 rotates with the drive shaft 10 so as to drive the second interactive bevel gear 22 and the third bevel gear 23 to rotate, such that the output bevel gear 80 are actuated by the second interactive bevel gear 22 and the third bevel gear 23 to rotate quickly (meanwhile, the braking device is stopped) and to drive the first bevel output gear 81 to revolve, and the first bevel output gear 81 actuates the first beveled drive gear 631 to rotate, then the second beveled drive gear 631 is actuated by the first beveled drive gear 631 to revolve and to drive the beveled transmitting gear 65 to rotate, thereafter the beveled transmitting gear 65 actuates the rear wheel 67 to revolve.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A continuous derailleur of a bicycle comprising:
    a drive shaft, a rotary shaft, a brake shaft, and a braking device;
    the rotary shaft mounted on the drive shaft;
    wherein the drive shaft includes a bevel gear member rotatably fitted thereon, and the bevel gear member has a first bevel gear and a second bevel gear;
    wherein the drive shaft includes a first pedal shaft fixed on a first end thereof adjacent to the first bevel gear;
    wherein the brake shaft includes a first interactive bevel gear disposed on a first end thereof and includes the braking device secured on a second end of the brake shaft, and a rotation speed of the brake shaft is controlled by controlling friction force of the braking device to the brake shaft so as to control a rotation speed of the first interactive bevel gear;
    wherein the first interactive bevel gear meshes with the first bevel gear of the bevel gear member;
    wherein the rotary shaft includes a second interactive bevel gear and a third interactive bevel gear which are rotatably connected on two ends of the rotary shaft respectively, and the second interactive bevel gear and the third interactive bevel gear mesh with the second bevel gear of the bevel gear member;
    wherein the continuous derailleur further comprises an output bevel gear;
    wherein the output bevel gear is rotatably fitted on a second end of the drive shaft, hence the second interactive bevel gear and the third interactive bevel gear mesh with the output bevel gear.

2. The continuous derailleur of the bicycle as claimed in claim 1 further comprising a sprocket rotatably fitted on the second end of the drive shaft, connected with the output bevel gear, and located away from the rotary shaft;
    wherein the drive shaft further includes a second pedal shaft mounted on the second end thereof adjacent to the sprocket.

3. The continuous derailleur of the bicycle as claimed in claim 1 further comprising: a first bevel output gear, a beveled transmitting gear, an output shaft, and a transmission hub;
    the first bevel output gear and the output bevel gear being rotatably fitted on the second end of the drive shaft, and the first bevel output gear being in connection with the output bevel gear;
    the driving device further including a first beveled drive gear and a second beveled drive gear which are fixed on two ends of the output shaft respectively;

wherein the first beveled drive gear meshes with the first bevel output gear, and the second beveled drive gear meshes with the beveled transmitting gear; and wherein the beveled transmitting gear is disposed on a first end of the transmission hub, and a second end of the transmission hub is coupled with the rear wheel.

4. The continuous derailleur of the bicycle as claimed in claim 3, wherein the friction force of the braking device decelerates or stops a rotation speed of the brake shaft so as to decelerate or stop a rotation speed of the first interactive bevel gear, such that a rotation speed of the bevel gear member is decelerated or stopped by the first interactive bevel gear so as to drive the second interactive bevel gear and the third interactive bevel gear to rotate, and the second interactive bevel gear and the third interactive bevel gear actuate the output bevel gear to revolve quickly, and the output bevel gear drives the first bevel output gear to rotate at the same rotation speed of the output bevel gear, thus driving the bicycle to run.

5. The continuous derailleur of the bicycle as claimed in claim 1, wherein the bevel gear member is adjacent to the rotary shaft.

6. The continuous derailleur of the bicycle as claimed in claim 1, wherein the output bevel gear is adjacent to the rotary shaft.

7. The continuous derailleur of the bicycle as claimed in claim 1, wherein the rotary shaft is vertically mounted on the drive shaft.

8. A continuous derailleur of a bicycle comprising:
a drive shaft, a rotary shaft, a brake shaft, and a braking device;
the rotary shaft mounted on the drive shaft;
wherein the drive shaft includes a bevel gear member rotatably fitted thereon adjacent to the rotary shaft, and the bevel gear member has a first bevel gear and a second bevel gear;
wherein the drive shaft includes a first pedal shaft fixed on a first end thereof adjacent to the first bevel gear;
wherein the brake shaft includes a first interactive bevel gear disposed on a first end thereof and includes the braking device secured on a second end of the brake shaft, and a rotation speed of the brake shaft is controlled by controlling friction force of the braking device to the brake shaft so as to control a rotation speed of the first interactive bevel gear;
wherein the first interactive bevel gear meshes with the first bevel gear of the bevel gear member;
wherein the rotary shaft includes a second interactive bevel gear and a third interactive bevel gear which are rotatably connected on two ends of the rotary shaft respectively, and the second interactive bevel gear and the third interactive bevel gear mesh with the second bevel gear of the bevel gear member;
wherein the continuous derailleur further comprises an output bevel gear and a sprocket;
wherein the output bevel gear is rotatably fitted on a second end of the drive shaft, hence the second interactive bevel gear and the third interactive bevel gear mesh with the output bevel gear;
wherein a sprocket is rotatably fitted on the second end of the drive shaft, connected with the output bevel gear, and located away from the rotary shaft;
wherein the drive shaft further includes a second pedal shaft mounted on the second end thereof adjacent to the sprocket.

9. The continuous derailleur of the bicycle as claimed in claim 8, wherein the rotary shaft includes a second interactive bevel gear and a third interactive bevel gear which are rotatably connected on two ends of the rotary shaft respectively.

10. The continuous derailleur of the bicycle as claimed in claim 8, wherein the bevel gear member is adjacent to the rotary shaft.

11. The continuous derailleur of the bicycle as claimed in claim 8, wherein the output bevel gear is adjacent to the rotary shaft.

12. The continuous derailleur of the bicycle as claimed in claim 8, wherein the rotary shaft is vertically mounted on the drive shaft.

* * * * *